W. S. H. HAMILTON.
SYSTEM OF AUTOMATIC CONTROL FOR MOTORS.
APPLICATION FILED MAR. 18, 1918.
1,295,487.  
Patented Feb. 25, 1919.
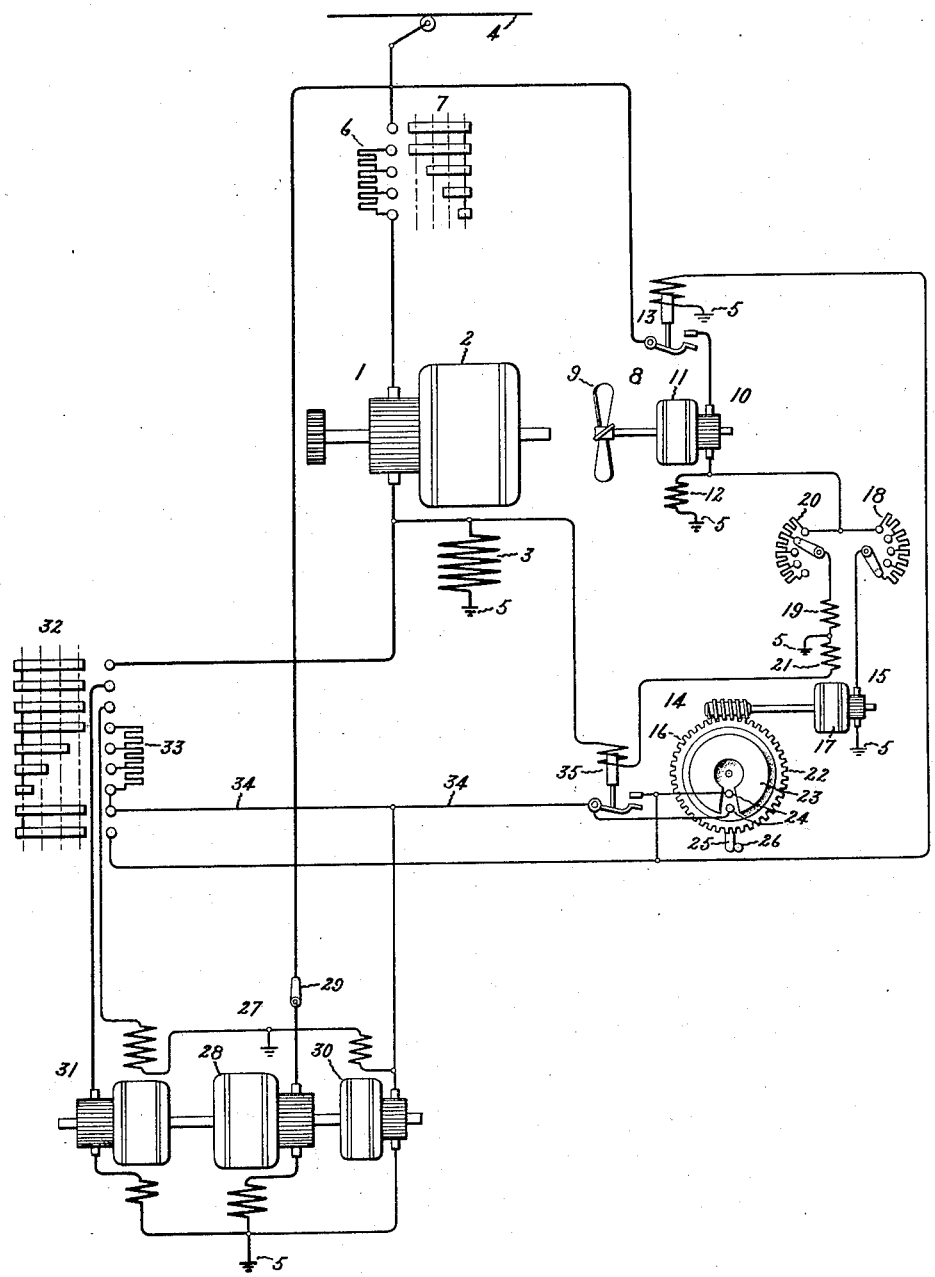
Inventor:
William S. H. Hamilton,
by Albert G. Davis
His Attorney.

UNITED STATES PATENT OFFICE.

WILLIAM S. H. HAMILTON, OF SCHENECTADY, NEW YORK, ASSIGNOR TO GENERAL ELECTRIC COMPANY, A CORPORATION OF NEW YORK.

SYSTEM OF AUTOMATIC CONTROL FOR MOTORS.

1,295,487.  Specification of Letters Patent.  Patented Feb. 25, 1919.

Application filed March 18, 1918. Serial No. 223,133.

*To all whom it may concern:*

Be it known that I, WILLIAM S. H. HAMILTON, a citizen of the United States, residing in Schenectady, in the county of Schenectady, State of New York, have invented certain new and useful Improvements in Systems of Automatic Control for Motors, of which the following is a specification.

My invention relates to systems of automatic control for motors and particularly to systems of automatic control for motors employed in motor operated cooling means for electrical apparatus.

Electrical apparatus, with which motor operated cooling means are employed, may usually be operated continuously at loads not exceeding a predetermined load without objectionable rise in temperature although said cooling means are not operating and may be operated continuously at loads not exceeding a second predetermined higher load without objectionable rise in temperature if said cooling means are operating. Such apparatus may, however, be required to operate for certain periods at loads in excess of the second mentioned predetermined load. Obviously a considerable saving in the power consumed by the motor of the motor operated cooling means may be effected if it be operated only when the load on the electrical apparatus exceeds the first mentioned predetermined value. If, however, the apparatus be operated at loads exceeding the second mentioned predetermined value, it is desirable that said cooling means shall operate for some time after the occurrence of such loads, notwithstanding the load on said apparatus falls below said first mentioned predetermined value or even falls to zero, in order to effect the proper cooling of said apparatus.

The purpose of my invention, therefore, is to provide a new and improved system of control for motors, employed in motor operated cooling means for electrical apparatus, whereby a considerable saving in the power consumed by the motor, or motors, is effected and, at the same time, sufficient cooling of the apparatus is obtained. To this end I provide, in combination with electrical apparatus, a source of current therefor, and means for cooling said apparatus comprising a motor, load responsive means for causing said motor to operate when the load on said apparatus exceeds a predetermined value and for causing said motor to operate for a time after the load on said apparatus has exceeded a second higher predetermined value notwithstanding the load on said apparatus falls below said first predetermined value.

My invention may best be explained by referring to the accompanying drawing consisting of a single figure, in which is diagrammatically shown a system, embodying one modification of my invention, for automatically controlling the operation of a motor which drives a blower arranged to supply air to a dynamo-electric machine, and in which 1 represents a dynamo-electric machine having an armature 2 and a field winding 3. The armature 2 and field winding 3 are connected in series with each other and may be connected across a source of current supply comprising a trolley line 4 and ground 5 through an accelerating resistance 6 by means of the controller 7. 8 represents motor operated cooling means comprising a fan, or blower, 9, which is driven by a motor 10 having an armature 11 and a series field winding 12. The motor 10 is adapted to be connected between the trolley line 4 and ground 5 by means of the contactor 13. 14 represents load integrating means comprising a motor 15 and a dial switch 16. The motor 15 has an armature 17, connected in series with an adjustable resistance 18, across the field winding 12 of the motor 10, a field winding 19 connected, in series with an adjustable resistance 20, across the field winding 12, and a field winding 21 connected across the field winding 3 of the dynamo-electric machine 1. The field windings 19 and 21 are arranged so that the magnetomotive forces developed therein are opposed. The dial switch comprises a rotatably mounted disk 22 upon which is mounted and insulated therefrom a conducting segment 23 which is adapted, when the disk 22 is rotated from the position illustrated, to bridge stationary contacts 24. The disk 22 is connected by gearing, having a suitable reduction ratio, to the armature 17 of the motor 15 by which it may be rotated in either direction but is limited in its rotational movement by means of the lug 25 carried thereby and the stop 26. 27 represents a motor-generator set comprising a series motor 28, adapted to be connected between the trolley line 4 and ground 5 by means of the switch 29, a generator 30, and an exciter 31. The generator 30 serves to supply current for the controlling circuits and for the excitation of the exciter 31, but obviously any other source of current may be substituted therefor. The dynamo-electric machine 1 is normally operated as a motor by power supplied thereto from the supply circuit but, under some conditions, it may be desired to operate it, when driven by the momentum of the load to which it is connected as a generator to return power to the supply circuit. In the latter event the exciter 31 is connected, by means of the braking controller 32, to supply exciting current to the field winding 3. The controller 32 is also arranged to vary the excitation of the exciter by varying the resistance 33 in the field circuit thereof. The armature of the generator 30 is connected between ground 5 and the bus 34. One terminal of the operating winding of the contactor 13 is connected to ground 5 and the other terminal may be connected to the bus 34 by means of parallel circuits which are controlled respectively by the contactor 35, the dial switch 16 of the integrating means 14, and the lowermost pair of segments of the braking controller 32. The operating winding of the contactor 35 is shown connected in the circuit of the field winding 21, which is shunted across the field winding 3, but obviously it may be connected in any manner such that the current therein varies with the load on the dynamo-electric machine 1. The contactor 35 is designed and proportioned so that it will be closed only when the load on the dynamo-electric machine 1 exceeds a predetermined value, which may be referred to as the unblown rating. The magnetomotive force of the field winding 21 of the motor 15 will predominate over that of the field winding 19 when the load on the dynamo-electric machine 1 exceeds a second higher predetermined value, which may be referred to as the blown rating. The resistance 18 is proportioned and adjusted to have such a value that variations in the counter electromotive force of the armature 17 are practically negligible so that the armature current remains approximately constant and hence the speed of the motor 15 will vary approximately as its field strength.

The operation of my invention, as at present understood, is as follows:

Assume the switch 29 to be closed and the motor generator set 27 to be operating so that the generator 30 thereof maintains a voltage between the bus 34 and ground 5. Also assume the controller 7, the controller 32, and the dial switch 16 of the load integrating means 14 to be in the positions illustrated. The dynamo-electric machine 1 is then at a standstill and the contactors 13 and 35 are open, as illustrated. Now assume the controller 7 to be moved toward the left so that current is supplied to the dynamo-electric machine 1 to drive it as a motor. So long as the load on the dynamo-electric machine 1 does not exceed the unblown rating thereof, the contact 35 will remain open and hence the contactor 13 will likewise remain open so that the motor 10 will not operate. If, however, the load on the dynamo-electric machine 1 exceeds the unblown rating thereof, the contactor 35 will be closed thereby connecting the operating winding of the contactor 13 to the bus 34 and causing the contactor 13 to close, whereupon the motor 10, which drives the blower 9, will be set in operation. When the motor 10 is operating, current will be supplied to the armature 17 and the field winding 19 of the motor 15. Providing the load on the dynamo-electric machine 1 does not exceed the blown rating thereof, the magnetomotive force of the field winding 19 will predominate over the opposing magnetomotive force of the field winding 21. The torque developed by the motor 15 will, therefore, tend to rotate the disk 22 of the dial switch 16 in a counter clockwise direction and if the disk has the position illustrated when this condition occurs, the rotation thereof will be prevented by the engagement of the lug 25 carried thereby and the stop 26. If now the load on the dynamo-electric machine 1 exceeds the blown rating thereof, the magnetomotive force of the field winding 21 of the motor 15 will predominate over that of the field winding 19 and the motor 15 will rotate the disk 22 in a clockwise direction at a speed approximately proportional to the positive difference between the load upon the dynamo-electric machine 1 and the blown rating thereof. Upon the movement of the disk 22 from the position illustrated, the segment bridges the stationary contacts 24 and the operating winding of the contactor 13 is electrically connected to the bus 34 through a circuit in parallel to the circuit controlled by the contactor 35. If the load on the dynamo-electric machine continues to exceed the blown rating thereof, the motor 15 will continue to rotate the disk 22 in a clockwise direction. If, however, the load on the dynamo-electric machine 1 drop below the blown rating thereof, the magnetomotive force of the field winding 19 will predominate over that of the field winding 21 and the motor 15 will rotate the disk 22 in a counter clockwise direction at a speed approximately proportional to the negative difference between the load upon the dynamo-electric machine 1 and the blown rating thereof. Hence it will be seen that the load integrating means 14 serves to maintain the motor 10 in operation after the load on the dynamo-electric machine 1 has exceeded a predetermined value, which has been referred to as the blown rating thereof, so long as the integrated value of the positive differences between the load thereon and the blown rating exceeds the integrated value of the negative differences between the load thereon and the blown rating, regardless of the operation of the contactor 35 in response to variations in the momentary value of the load upon the dynamo-electric machine 1.

When the dynamo-electric machine 1 is operated as a generator to produce regenerative braking, the current traversing the field winding 3 thereof does not necessarily correspond to the load thereon and hence I have provided means whereby the contactor 13 will be closed and hence the motor 10 and blower 8 be operated whenever the dynamo-electric machine 1 is operated as a generator regardless of the load thereon. This means comprises a circuit, in parallel to that controlled by the contactor 35 and to that controlled by the load integrating means 14, which is controlled by the braking controller 32 so that the operating winding of the contactor 13 is energized whenever the braking controller 32 is in a position corresponding to generator operation of the dynamo-electric machine 1.

Although I have illustrated my invention as applied to a system employing series dynamo-electric machines, because this type of machine is most commonly used in railway traction systems, my invention is clearly not limited thereto. Furthermore, my invention is not limited in its application to dynamo-electric machines since it may be used with many other kinds of electrical apparatus.

While I have herein shown and described one modification of my invention, I do not desire to be limited to the exact arrangement shown and described but seek to cover in the appended claims all those modifications which come within the true spirit and scope of my invention.

What I claim as new and desire to secure by Letters Patent of the United States, is:—

1. The combination with electrical apparatus, of a source of current supply therefor, means for cooling said apparatus comprising a motor, load responsive means for causing said motor to operate when the load on said apparatus exceeds a predetermined value and for causing said motor to operate for a time after the load on said apparatus has exceeded a second higher predetermined value notwithstanding the load on said apparatus falls below said first predetermined value.

2. The combination with electrical apparatus, of a source of current supply therefor, means for cooling said apparatus comprising a motor, load responsive means for causing said motor to operate when the load on said apparatus exceeds a predetermined value, and means set in operation when the load on said apparatus exceeds a second higher predetermined value for causing said motor to operate for a time after the load on said apparatus has exceeded said second predetermined value notwithstanding the load on said apparatus falls below said first predetermined value.

3. The combination with electrical apparatus, of a course of current supply therefor, means for cooling said apparatus comprising a motor, load responsive means for causing said motor to operate when the load on said apparatus exceeds a predetermined value, and means set in operation when the load on said apparatus exceeds a second higher predetermined value for causing said motor to operate for a period, determined by the load conditions on said apparatus during the operation of said means, after the load on said apparatus has exceeded said second predetermined value notwithstanding the load on said apparatus falls below said first predetermined value.

4. The combination with electrical apparatus, of a source of current supply therefor, means for cooling said apparatus comprising a motor, load responsive means for causing said motor to operate when the load on said apparatus exceeds the unblown rating thereof, and load integrating means set in operation when the load on said apparatus exceeds the blown rating thereof for causing said motor to operate for a time after the load on said apparatus has exceeded the blown rating notwithstanding the load on said apparatus falls below the unblown rating.

5. The combination with electrical apparatus, of a source of current supply therefor, means for cooling said apparatus comprising a motor, load responsive means for causing said motor to operate when the load on said apparatus exceeds the unblown rating thereof, and load integrating means set in operation when the load on said apparatus exceeds the blown rating thereof for causing said motor to operate for a period, determined by the load conditions on said apparatus during the operation of said means, after the load on said apparatus has exceeded the blown rating notwithstanding the load on said apparatus falls below the unblown rating.

6. The combination with electrical apparatus, of a source of current supply therefor, means for cooling said apparatus comprising a motor, load responsive means for causing said motor to operate when the load on said apparatus exceeds a predetermined value and load integrating means operable, within the limits for which it is designed, for maintaining said motor in operation when the integrated value of the positive differences between the load on said apparatus and a predetermined load exceeds the integrated value of the negative differences between the load on said apparatus and said predetermined load regardless of the momentary value of the load on said apparatus.

7. The combination with electrical apparatus, of a source of current supply therefor, means for cooling said apparatus comprising a motor, and means for controlling the operation of said motor comprising parallel circuits, means responsive to momentary values of the load on said apparatus for controlling one of said circuits and load integrating means for controlling another of said circuits.

8. The combination with electrical apparatus, of a source of current supply therefor, means for cooling said apparatus comprising a motor, and means for controlling the operation of said motor comprising parallel circuits, means responsive to momentary values of the load on said apparatus for controlling the continuity of one of said circuits, and means for controlling the continuity of another of said circuits comprising a motor having an armature and opposed field windings, one of which is energized in accordance with the load on said apparatus.

9. The combination with electrical apparatus, of a source of current supply therefor, means for cooling said apparatus comprising a motor, a contactor having an operating winding for connecting said motor to said source, parallel circuits for conveying current for energizing said winding, a contactor for maintaining one of said circuits closed when the load on said apparatus exceeds a predetermined value, means for controlling another of said circuits comprising a dial switch and a motor for operating the same, said motor comprising opposed field windings and an armature, one of said field windings being energized in proportion to the current traversing said motor and another of said field windings being energized in proportion to the current traversing said apparatus, and means for maintaining an approximately constant current in said armature notwithstanding variations in the counter electromotive force thereof.

In witness whereof, I have hereunto set my hand this 16th day of March, 1918.

WILLIAM S. H. HAMILTON

Copies of this patent may be obtained for five cents each, by addressing the "Commissioner of Patents, Washington, D. C."